(12) United States Patent
Householder et al.

(10) Patent No.: US 10,072,836 B2
(45) Date of Patent: Sep. 11, 2018

(54) DEVICES AND METHODS FOR AREA LIGHTING

(71) Applicant: Fraen Corporation, Reading, MA (US)

(72) Inventors: John R. Householder, Reading, MA (US); John E. Audette, Burbank, CA (US); James B. Audette, Valencia, CA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 14/083,170

(22) Filed: Nov. 18, 2013

(65) Prior Publication Data

US 2014/0078733 A1 Mar. 20, 2014

Related U.S. Application Data

(63) Continuation of application No. 13/042,215, filed on Mar. 7, 2011, now Pat. No. 8,585,274.

(Continued)

(51) Int. Cl.
*F21V 7/04* (2006.01)
*F21V 31/00* (2006.01)
(Continued)

(52) U.S. Cl.
CPC ............ *F21V 31/005* (2013.01); *F21V 5/04* (2013.01); *F21V 7/0091* (2013.01); *F21V 13/04* (2013.01);
(Continued)

(58) Field of Classification Search
CPC .. G02B 6/0088; G02B 6/0081; G02B 6/0015; G02B 6/24
(Continued)

(56) References Cited

U.S. PATENT DOCUMENTS 6,152,611 A * 11/2000 Mardirossian ................. 385/99
2001/0026203 A1* 10/2001 Van Zeeland ................ 335/205
(Continued)

FOREIGN PATENT DOCUMENTS

DE 10312364 B4 1/2005
EP 2058584 5/2009
(Continued)

OTHER PUBLICATIONS

Notice of Opposition to a European Patent for Application No. EP10760144.5, mailed Jun. 4, 2014; 6 pages.
(Continued)

*Primary Examiner* — William Carter
(74) *Attorney, Agent, or Firm* — Reza Mollaaghababa; Thomas J. Engellenner; Pepper Hamilton LLP

(57) ABSTRACT

Environmentally sealed optical systems, and methods for sealing them, are disclosed. Such optical systems include area lighting panels and other optical systems. For example, in one exemplary aspect of the invention, a sealed optical system includes a substrate having first and second light sources disposed thereon, and a light-shaping panel with first and second optics formed therein that are positioned (e.g., aligned) to receive light from the first and second light sources, respectively. A sealing membrane is disposed between the substrate and the light-shaping panel, with a first adhesive surface contacting the substrate and a second adhesive surface contacting the light-shaping panel. The sealing membrane has first and second openings formed therein that allow light to pass from the first and second light sources to the first and second optics, respectively, while allowing the sealing membrane to independently seal the light sources from one another and from the external environment.

18 Claims, 11 Drawing Sheets

Related U.S. Application Data

(60) Provisional application No. 61/228,038, filed on Jul. 23, 2009, provisional application No. 61/228,042, filed on Jul. 23, 2009, provisional application No. 61/228,045, filed on Jul. 23, 2009, provisional application No. 61/228,049, filed on Jul. 23, 2009, provisional application No. 61/228,062, filed on Jul. 23, 2009, provisional application No. 61/228,792, filed on Jul. 27, 2009, provisional application No. 61/229,971, filed on Jul. 30, 2009.

(51) Int. Cl.

| | |
|---|---|
| *F21V 5/04* | (2006.01) |
| *F21V 7/00* | (2006.01) |
| *F21V 13/04* | (2006.01) |
| *F21V 31/04* | (2006.01) |
| *G02B 5/00* | (2006.01) |
| *G02B 19/00* | (2006.01) |
| *F21V 5/00* | (2018.01) |
| *F21W 131/103* | (2006.01) |
| *F21W 131/105* | (2006.01) |
| *F21W 131/407* | (2006.01) |
| *F21Y 105/10* | (2016.01) |
| *F21Y 115/10* | (2016.01) |

(52) U.S. Cl.
CPC .............. *F21V 31/04* (2013.01); *G02B 5/005* (2013.01); *G02B 19/0028* (2013.01); *G02B 19/0061* (2013.01); *F21V 5/007* (2013.01); *F21W 2131/103* (2013.01); *F21W 2131/105* (2013.01); *F21W 2131/407* (2013.01); *F21Y 2105/10* (2016.08); *F21Y 2115/10* (2016.08)

(58) Field of Classification Search
USPC ........................................ 362/617, 620, 628
See application file for complete search history.

(56) References Cited

U.S. PATENT DOCUMENTS

| | | | |
|---|---|---|---|
| 2007/0201225 A1 | 8/2007 | Holder et al. | |
| 2008/0049449 A1* | 2/2008 | Liu et al. ..................... | 362/617 |
| 2008/0273325 A1* | 11/2008 | Wilcox .................. | F21V 5/007 362/240 |
| 2008/0283175 A1* | 11/2008 | Hagood et al. ............... | 156/145 |
| 2009/0086508 A1* | 4/2009 | Bierhuizen ................... | 362/617 |
| 2010/0109034 A1* | 5/2010 | Bierhuizen et al. ............ | 257/98 |

FOREIGN PATENT DOCUMENTS

| | | |
|---|---|---|
| WO | 2005022216 A2 | 3/2005 |
| WO | 2011011734 | 1/2011 |
| WO | PCT/US2010/043126 | 1/2012 |

OTHER PUBLICATIONS

[No Author Listed] Wikipedia, "Silicone"; retrieved Dec. 10, 2014 from http://en.wikipedia.org/wiki/Silicone.

[No Author Listed] Wikipedia, "IP Code"; retrieved Dec. 10, 2014 from http://en.wikipedia.org/wiki/IP_Code.

[No Author Listed] Wikipedia, Eye Lighting International, "LED Lighting Distribution Types"; retrieved Dec. 10, 2014 from http://www.eyelighting.com/_CE/pagecontent/Documents/Education%20secti.

Reply to an examination report in opposition proceedings dated Aug. 13, 2017 in related Application No. EP10760144.5, pp. 50.

Ledil F'Form Optics. Titanum-3 Lenses for Dragon LEDs, published Mar. 14, 2007, pp. 2.

Ledil F'Form Optics. Adhesive Tape used in Ledil lenses; published May 22, 2006, pp. 1.

Kuntze T. Plastic Optics Enable LED Lighting Revolution When Highest Precision Meets Low Prices. Optik & Photonic, Dec. 2007, No. 4, pp. 42-45, pp. 4.

3M™ Adhesives and Tapes. Design & Production Guide for Application Success. 2008, pp. 100.

Ledil Standard Optics for CREE LEDs (pp. 1-20; Oct. 2008), pp. 20.

Ledil Standard Optics for Osram LEDs (pp. 21-37; Sep. 2008), pp. 17.

Ledil F'Form Optics. STRADA-B-XP Lenses for Cree XP-E LEDs, published Jul. 2, 2009, pp. 3.

Ledil Product catalogue Jun. 2009, pp. 2.

3M VHB Tapes Design Guide Improve process, improve products, 2005, pp. 16.

Ledil F'Form Optics. STRADA-A-XP Lenses for Cree XP-E LEDs, published Mar. 26, 2009, pp. 4.

https://web.archive.org/web/20090203224823/http://ledil.com/, Jul. 26, 2017, pp. 1.

International Search Report dated Jan. 12, 2010 from corresponding PCT/US2010/043126, pp. 4.

International Written Opinion dated Jan. 12, 2010 from corresponding PCT/US2010/043126, pp. 4.

International Preliminary Report on Patentability (IPRP) dated Jan. 24, 2012 from corresponding PCT/US2010/043126, pp. 5.

International Search Report dated Jan. 13, 2012 from corresponding PCT/US2011/047441, pp. 5.

International Written Opinion dated Jan. 13, 2012 from corresponding PCT/US2011/047441, pp. 9.

International Preliminary Report on Patentability (IPRP) dated Feb. 12, 2013 from corresponding PCT/US2011/047441, pp. 10.

Office Action dated Jun. 26, 2012 in related U.S. Appl. No. 13/042,215, pp. 13.

Office Action dated Nov. 30, 2012 in related U.S. Appl. No. 13/042,215, pp. 14.

Notice of opposition to European patent Dated Feb. 25, 2015 in related Application No. EP10760144.5, pp. 37.

Reply to an examination report in opposition proceedings dated Sep. 7, 2017 in related Application No. EP10760144.5, pp. 50.

\* cited by examiner

DEVICES AND METHODS FOR AREA LIGHTING

CROSS-REFERENCE TO RELATED APPLICATIONS

The present application is a continuation application of U.S. patent application Ser. No. 13/042,215 filed on Mar. 7, 2011, entitled "Devices and Methods for Area Lighting," which claims priority to U.S. Provisional Application Ser. No. 61/228,038 filed Jul. 23, 2009, entitled "Area Lighting Devices and Methods," U.S. Provisional Application Ser. No. 61/228,042 filed Jul. 23, 2009, entitled "Area Lighting Devices and Methods," U.S. Provisional Application Ser. No. 61/228,045 filed Jul. 23, 2009, entitled "Area Lighting Devices and Methods," U.S. Provisional Application Ser. No. 61/228,049 filed Jul. 23, 2009, entitled "Area Lighting Devices and Methods," U.S. Provisional Application Ser. No. 61/228,062 filed Jul. 23, 2009, entitled "Area Lighting Devices and Methods," U.S. Provisional Application Ser. No. 61/228,792 filed Jul. 27, 2009, entitled "Light Panels for Area Lighting," and U.S. Provisional Application Ser. No. 61/229,971 filed Jul. 30, 2009, entitled "Area Lighting Devices and Methods for Large Light Emitting Diodes." This application incorporates by reference each of the above applications to which it claims priority in its entirety.

FIELD OF THE INVENTION

The present application relates to lighting and/or illumination devices and associated methods that employ optics to illuminate an area.

BACKGROUND OF THE INVENTION

Light emitting diode (LED) illumination systems have been developed to replace the conventional incandescent- or fluorescent-based systems to reduce energy costs and increase reliability. LED illumination systems consume less energy than systems containing conventional sources while exhibiting much longer lifetimes. Such systems are typically made by mounting a plurality of LEDs to a flat printed circuit board (PCB), with the flat surface of the PCB on which the LEDs are mounted facing toward the desired direction of the light output.

LED illumination systems are versatile and have been used across a broad range of applications. For example, optical systems utilizing LEDs can have applications in area lighting, flashlights, spot lighting, customizable/adjustable lighting systems, household lighting, wearable headlamps or other body-mounted lighting, among others. Optical systems also find application in area lighting, for example in streetlights or otherwise. Area lighting presents unique requirements for illumination coverage and uniformity, e.g., on a roadway or pathway, with a minimum number of lighting fixtures. The use of optical systems, whether for area lighting or otherwise, for such a range of applications subjects them to a variety of environments.

Accordingly, an object of the invention is to provide improved devices and methods for area lighting. A further object of the present invention is to provide an optical system for use in various environments, both indoor and outdoor, whether wet or dry, while protecting the optical system from fouling.

SUMMARY OF THE INVENTION

In one exemplary aspect of the invention, an optical system is provided that includes a substrate for supporting a plurality of light sources, a light-shaping panel comprising a plurality of optics distributed thereacross, and a sealing membrane disposed between the substrate and the light-shaping panel. The light-shaping panel can be optically coupled to the substrate such that each of the optics receives light from one or more of the light sources. The sealing membrane can include two opposed adhesive surfaces such that one of the adhesive surfaces is in contact with at least a portion of the substrate and the other adhesive surface is in contact with at least a portion of the light-shaping panel so as to provide a seal between the substrate and the light-shaping panel.

In a related exemplary aspect, the light-shaping panel can have a nominal surface area greater than about 4 square inches. The light-shaping panel can have an aspect ratio about 1.

In a related exemplary aspect, the optics can be configured to re-direct the received light such that the optics collectively provide a substantially rectangular output light distribution. For example, the optics can be configured to redirect light from the plurality of light sources into a Type VS (square) streetlight pattern. In some embodiments, the optics can be integrally formed in the light-shaping panel. In other embodiments, the optics can be molded into the light-shaping panel.

In a related exemplary aspect, the plurality of optics can provide a substantially identical output light distribution. The output light distribution of each of the plurality of optics can substantially overlap. In another exemplary aspect, the output light distribution of the plurality of optics can generate a pattern, with the output light distribution of at least one of the plurality of optics, for example, forming only a portion of the pattern. In other cases, at least one of the plurality of optics can provide a different output light distribution from at least a second of the plurality of optics.

The sealing membrane can include a plurality of openings distributed therein so as to allow passage of light from the light sources to the optics. The plurality of openings can substantially encircle one of the plurality of light sources. In some embodiments, the sealing membrane can form both a perimeter and interstitial seal around and between the plurality of light sources. The adhesive surface of the sealing membrane that is in contact with the light-shaping panel can configured to be in contact with at least about 70%, 80%, 90%, or other proportion of the proximal surface of the light-shaping panel. For example, in one embodiment, the adhesive surface can be in contact with substantially the entire proximal surface of the light-shaping panel. The sealing membrane can also include a plurality of openings distributed therein that allows a plurality of fasteners to pass therethrough to secure the substrate to the light-shaping panel.

The sealing membrane can be made of a variety of materials, such as a foam. That foam can be a closed-cell foam and/or be formed of acrylic. The sealing membrane can be configured to meet the IP66 standard (that is, the Ingress Protection 66 standard of the IEC, also referred to as International Protection 66 standard) or a greater standard (e.g., IP68). For example, the sealing membrane can be configured to prevent dust from entering between the substrate and the light shaping panel and/or can be configured to allow for the continuous immersion of the optical system in water, e.g., sufficiently to meet such standards or otherwise.

The substrate of the optical system can be a printed circuit board. In one embodiment, the printed circuit board can be composed of a fiberglass containing material. In one embodiment, the light sources can extend from the substrate into the openings formed in a sealing membrane.

In another exemplary aspect of the invention, a method for sealing an optical system is provided. The method can include providing a substrate and a light-shaping panel, and aligning the substrate and the light-shaping panel. The substrate can support a plurality of light sources and the light-shaping panel can include a plurality of optics. The substrate and the light-shaping panel can be aligned such that each of the light sources are optically coupled with one of the optics. The method can also include disposing a sealing membrane having two opposed adhesive surfaces between the substrate and the light-shaping panel. One of the adhesive surfaces can be in contact with at least a portion of the substrate and the other of the adhesive surfaces can be in contact with at least a portion of the light-shaping panel. The method can also include compressing the substrate, light-shaping panel, and sealing membrane so as to bond the adhesive surfaces to the substrate and the light-shaping panel and thereby provide a seal between the substrate and the light-shaping panel.

In another exemplary aspect of the invention, an optical system is provided having a substrate, a light-shaping panel, a first and second optic formed in the panel, and a sealing membrane. The first optic is positioned to receive light from a first light source and the second optic is positioned to receive light from a second light source. The sealing membrane has a first adhesive surface in contact with the substrate and a second, opposed adhesive surface in contact with the panel. The sealing membrane includes a first opening formed therein to allow passage of light from the first light source to the first optic, and a second opening formed therein to allow passage of light from the second light source to the second optic. The first and second openings are spaced apart from one another so that the sealing membrane independently seals the first light source and the second light source from one another and from the external environment.

In some embodiments, the first and second optics are configured to re-direct the received light such that the optics collectively provide a substantially rectangular output light distribution.

The sealing membrane of the optical system can form a perimeter and interstitial seal between the first and second light sources. The sealing membrane be formed of a variety of materials, e.g., as described above, and can be configured to seal against dust, water or other elements sufficient to meet standards, e.g., as described above, or otherwise.

In one embodiment, the light-shaping panel of the optical system has a distal surface facing an external environment and an opposed proximal surface facing the substrate. The adhesive surface of the sealing membrane can be in contact with at least about 70%, 80%, 90%, or other proportion of the proximal surface of the light-shaping panel, exclusive of portions of said proximal surface representing recesses for accommodating said plurality of light sources. In another embodiment, the adhesive surface of the sealing membrane can be in contact with substantially the entire proximal surface of the light-shaping panel.

In one embodiment, the light-shaping panel can have an aspect ratio of about 1. In one embodiment, the light-shaping panel can have a nominal surface area greater than about 4 square inches, greater than about 9 square inches, or greater than about 16 square inches.

BRIEF DESCRIPTION OF THE DRAWINGS

This invention will be more fully understood from the following detailed description taken in conjunction with the accompanying drawings, in which.

DETAILED DESCRIPTION

Figure 1:
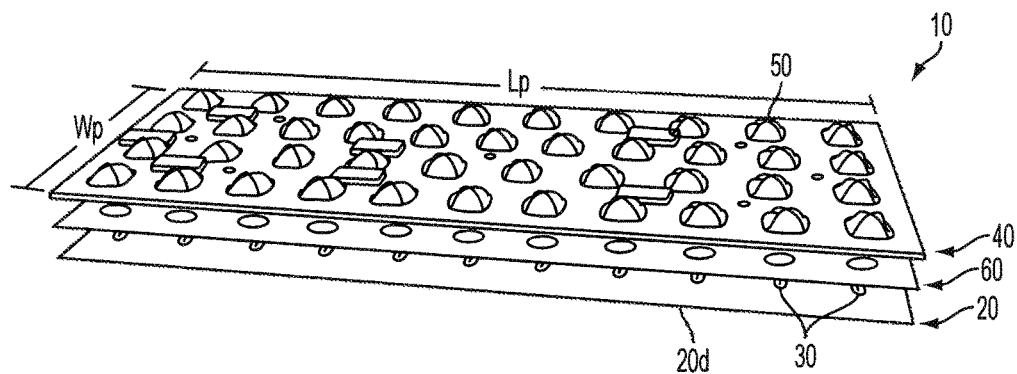
FIG. 1 is an exploded perspective view of an exemplary embodiment of an optical system, according to the teachings of the invention.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention.

The present application relates generally to lighting and/or illumination optical systems (in particular, light panels) and associated methods that employ optics to illuminate an area. As shown in FIGS. 1-4, an exemplary embodiment of an optical system 10 according to the teachings of the invention can include a substrate 20 for supporting one or more light sources 30, a light-shaping panel 40 having a variety of optics 50, and a sealing membrane 60.

The substrate 20 provides a surface on which one or more light sources 30 can be disposed. Generally, the substrate 20 defines a proximal surface 20p and a distal surface 20d, the distal surface 20d providing one or more areas in which one or more light sources 30 can be coupled and maintained in a given orientation. In an exemplary embodiment, as shown in FIGS. 1-4, the substrate 20 can be a printed circuit board (PCB) that includes the circuitry required to drive the one or more light sources 30 disposed on the distal surface of the PCB. The PCB can be attached to a power supply and can include control units, thermal monitoring circuitry, and/or other circuitry. It will be appreciated by a person skilled in the art that the PCB can be any of, by way of non-limiting examples, a metal core printed circuit board, flex circuits, molded, or a custom circuit board, all configured in the conventional manner known in the art, as modified by the teachings herein.

The substrate 20 can also be formed in a variety of sizes, shapes, and configurations, depending on the requirements of the optical system 10 and its intended application. For instance, although FIGS. 1-4 depict the optical system 10 as having a unitary substrate 10 on which a plurality of light sources 30 are disposed, the optical system 10 of the present invention can contain any number of substrates, each of which is configured to support one or more of the light sources 30. Referring again to the exemplary embodiment shown in FIGS. 1-4, the distal surface 20d of the substrate 20 on which the light sources 30 are disposed can be substantially planar. However, it is within the scope of this invention that the substrate 20 be non-planar, for example, concave or convex. It should also be appreciated that the substrate 20, and optical system 10 in general, can be formed in any shape, for example, a circle, ring, rectangle, square, or any other custom shape. As will be discussed in more detail below, the substrate 20 (and the optical system 10 generally) can have any desired nominal surface area and aspect ratio, depending on the requirements for the optical system 10 and its intended application.

As shown in FIGS. 1-4, a plurality of light sources 30 can be coupled to the substrate 20. Although the light sources 20 are preferably solid state light sources, such as LEDs, a wide variety of light sources can be used with the devices and methods described herein. By way of non-limiting examples, incandescent bulbs, fluorescent lights, and high-intensity gas discharge lamps can be used in conjunction with the optical system 10. Because the devices and associated methods described herein can have a variety of applications, the appropriate light sources 30 can be chosen based on the intended use (e.g., in streetlights, flashlights, spot lighting, customizable/adjustable lighting systems, household lighting, wearable headlamps or other body-mounted lighting, among others).

Figure 2:
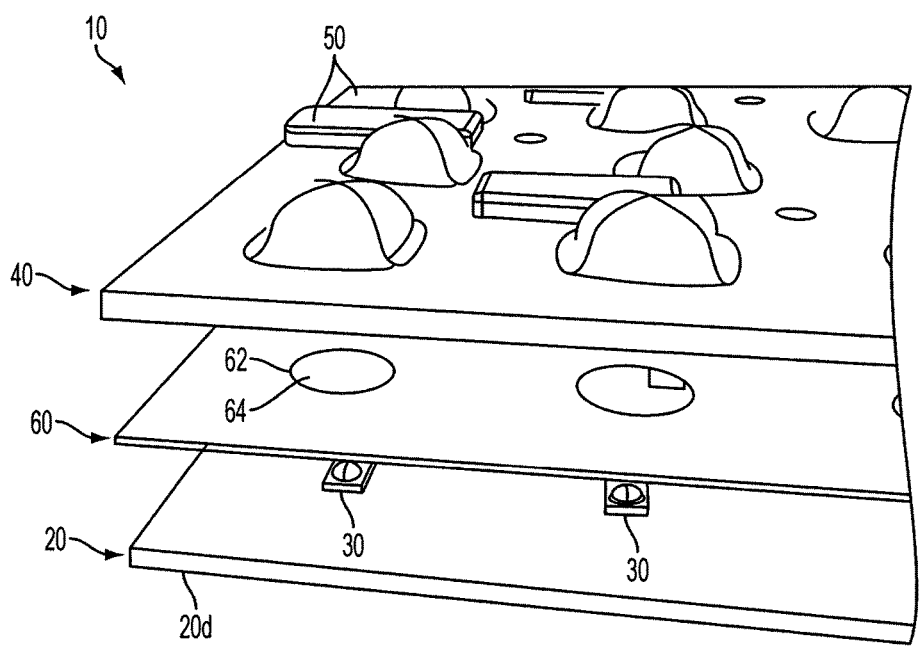
FIG. 2 is an exploded perspective view of a portion of the system of FIG. 1.
Figure 3:
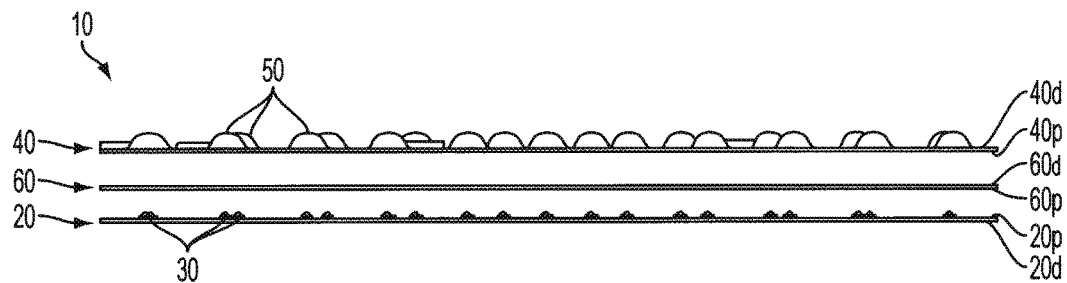
FIG. 3 is an exploded side view of the system of FIG. 1.
Figure 4:
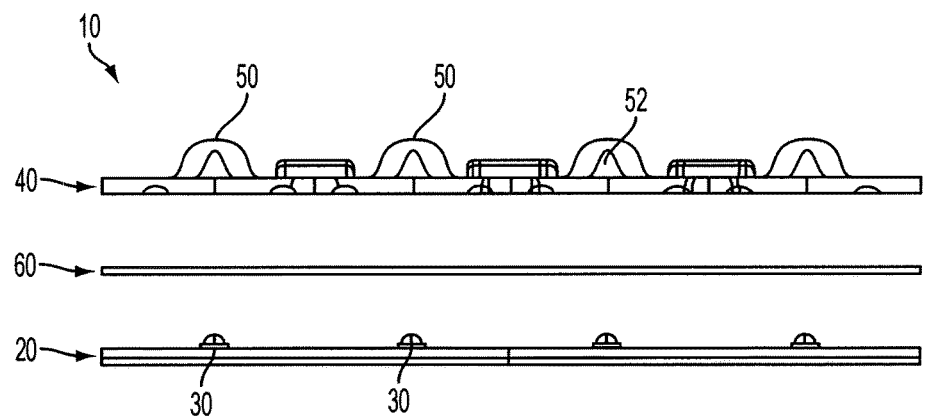
FIG. 4 is a cross-sectional side view of the system of FIG. 1.

The light sources 30 can be arranged on the substrate in any spatial distribution. As best shown in FIG. 2, the plurality of light sources 30 are substantially uniformly distributed (i.e., each of the light sources 30 is spaced substantially equidistant from its neighboring light source 30) across the distal surface 20d of the substrate 20. However, in alternative embodiments, the light sources 30 can be distributed non-uniformly, e.g. randomly or according to a pattern such as in a circle or a line.

The light sources can extend distally from the distal surface 20d of the substrate 20 and can be coupled to the substrate 20 in any manner known in the art. For example, the light sources may be mounted, soldered, glued, welded, or otherwise attached to the distal surface 20d of the substrate 20. The light sources 30 can be fixedly or detachably coupled to the substrate 20.

The optical system 10 can also include a light-shaping panel 40 across which one or more optics 50 are distributed. As shown in FIGS. 1-4, the light-shaping panel 40 can define a proximal surface 40p and a distal surface 40d, with at least a portion of the light-shaping panel 40 configured to transmit light therethrough. The proximal surface 40p of the light panel 40 is spaced apart from and substantially opposed to the distal surface 20d of the substrate 20. At least a portion of the proximal surface 40p is configured to receive light generated by the one or more light sources 30 disposed on the substrate 20. The proximal surface 40p can allow the light to enter the light-shaping panel 40 and can be configured to refract, reflect, focus, diffuse or otherwise deflect a portion of the light incident on the proximal surface 40p. The distal surface 40d of the light-shaping panel 40 faces the external environment. At least a portion of the distal surface 40d can be configured to transmit a portion of light incident thereon from within the light-shaping panel 40. The distal surface 40d can be configured to refract, reflect, focus, diffuse or otherwise deflect the incident light. The optics 50 and the remainder of the light-shaping panel 40 can form a unitary, unibody structure. In other words, the optics 50 can be integrally formed with the light-shaping panel 40, rather than attached or otherwise coupled to the light-shaping panel by adhesive, fasteners, or other mechanical interlocks. Thus, in an exemplary embodiment, the optics 50 can form a contiguous, unitary structure with the rest of the light-shaping panel 40.

Although the proximal and distal surfaces 40p, 40d of the light-shaping panel 40 can be substantially planar, in this exemplary embodiment, the profile of light-shaping panel can vary across its surfaces. The optics 50 (which can be integrally formed in the light-shaping panel 40) can protrude distally from the light-shaping panel, which is otherwise substantially flat. The proximal surface 40p can also vary across its area, for example, by defining recesses 52 formed in the proximal surface 40p that can at least partially accommodate one or more of the light sources 30 for optical coupling to that optic 50. The recesses 52 can define a proximal edge 54, from which the recesses 52 can extend distally from the proximal surface 40p. In other embodiments, the entire proximal and/or distal surfaces of the light panel can be flat with the optic being integrated therein.

Figure 5:
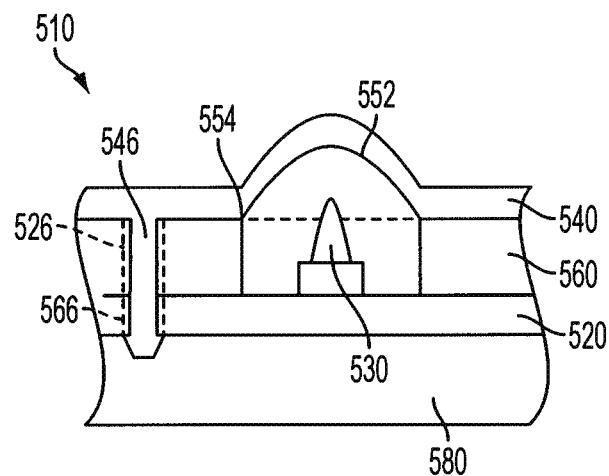
FIG. 5 is a cross-sectional side view of another exemplary embodiment of an optical system.

The light-shaping panel 40 can have any size and can be configured to support any number of optics 50. For example, the light-shaping panel 40 (and the optical system 10 generally) can have any desired nominal surface area and aspect ratio, depending on the requirements for the optical system 10 and its intended application. The "nominal surface area" of the light-shaping panel 40 is intended to refer to the area defined by the width ($W_P$) of the light-shaping panel 40 multiplied by the length ($L_P$) of the light-shaping panel 40, exclusive of the area attributable to the recesses 52 that receive the light sources, or to other recesses, cavities, or protrusions on the surface of the light-shaping panel (40). In preferred embodiments, the light-shaping panel 40 can have a nominal surface area of at least about four square inches, for example, or about nine square inches, or about sixteen square inches. The "aspect ratio" of the light-shaping panel 40 is intended to refer to the ratio of its width ($W_P$) relative to its length ($L_P$). The aspect ratio of the light-shaping panel can be greater than, equal to, or less than one. As shown in FIG. 5, for example, the aspect ratio of the light-shaping panel (40) is less than one (i.e., the width is less than its length).

The one or more optics 50 can be aligned with each of the one or more light sources 30 disposed on the distal surface 20d of the substrate 20 such that each optic 50 receives and transmits the light generated by a single light source 30. As will be appreciated by those skilled in the art, the optics 50 can have a variety of configurations to transmit light to the external environment in a pre-determined distribution depending on the design requirements of the optical system 10 and its intended use. Each of the one or more optics 50 can be identical to the others. Alternatively, at least one of the one or more optics 50 can vary from the remainder of the optics (e.g., two or more different optics, selected for example from those described herein and illustrated in FIGS. 7-14B, or others, can be employed). In other words, each of the one or more optics 50 need not be identical or provide the same output light distribution characteristics. The optics 50 can be configured to re-direct the light generated by the plurality of light sources 30 such that the optics 50 collectively provide, for example, a substantially rectangular output light distribution or a Type VS (square) or other streetlight pattern. For example, the optics 50 and the light-shaping panel 40 can be configured such that the output light distribution from each of the optics 50 provides a substantially identical output light distribution that substantially overlaps with the output light distributions of the other optics 50 to collectively form the desired overall pattern. That is, each of the optics 50 can provide an output light distribution which corresponds to the entire desired overall pattern. In this embodiment, it can be possible to alter the intensity of the collective output light distribution by controlling, for example, the number of the optics 50 (e.g., by turning selected optics on or off) used to create the desired pattern. Alternatively, the optics 50 and the light-shaping panel 40 can be configured such that the output light distribution from each of the optics 50 only partially overlaps, or alternatively is disjointed from the output light distribution of the other optics 50, such that the output light distribution from each optic 50 (which can have identical or varying output light distribution characteristics) only forms a portion of the desired overall pattern. In this embodiment, it can be possible to control the desired overall pattern by controlling, for example, the optics 50 (e.g., by turning selected optics on or off) used to create the pattern.

Again referring to FIGS. 1-4, the optical system 10 can also include a sealing membrane 60 disposed between the substrate 20 and the light-shaping panel 40. As shown best in FIGS. 3 and 4, the sealing membrane 60 generally defines opposed proximal and distal surfaces 60p, 60d, with at least a portion of the proximal and distal surfaces having an adhesive disposed thereon to couple the sealing membrane 60 to adjacent structures. The sealing membrane 60 can be disposed between the substrate 20 and the light-shaping panel 40 such that the proximal surface 60p of the sealing membrane 60 is in contact with and bonds with at least a portion of the distal surface 20d of the substrate 20, and the distal surface 60d of the sealing membrane 60 is in contact with and bonds with at least a portion of the proximal surface 40p of the light-shaping panel 40.

The sealing membrane 60 can define one or more openings 62 formed therethrough. As will be discussed below, the openings 62 can be pre-formed in the sealing membrane prior to assembly of the optical system 10. The one or more openings 60 can be aligned with each of the one or more light sources 30 disposed on the substrate 20 and the one or more optics 50 to allow the passage of the light emitted by each light source 30 to its respective optic 50. With such an alignment, the light sources 30 can extend distally through the openings 60, for example, and into the recesses 52 formed in the proximal surface 40p of the light-shaping panel 40, as best seen in FIG. 5. In one embodiment, the edges 64 of the openings 62 can be substantially aligned with the edges 54 of the recesses 52 so as to allow passage of light from the light sources 30 to their respective optics 50 without interference from the sealing membrane 60. Preferably, the edges 64 of the openings 62 are aligned with the edges 54 of the recesses 52 within a fault tolerance of about 0.2 mm.

As will be appreciated by one of skill in the art, any adhesive capable of bonding the sealing membrane 60 to the substrate 20 and light-shaping panel 40 can be used. The adhesive can be disposed on the proximal and distal surfaces 60p, 60d of the sealing membrane 60. The adhesive can have any thickness including, by way of non-limiting example, a thickness of about 0.2 mm to about 0.7 mm. In a preferred embodiment, the adhesive can be a pressure sensitive adhesive. The proximal and distal surfaces 60p, 60d of the sealing membrane 60 can have the same or different adhesive disposed thereon. In a preferred embodiment, the adhesive allows for a rapid initial cure. Preferably, the adhesive fully cures within 24 hours. In a preferred embodiment, the adhesive is pre-disposed on the surfaces of the sealing membrane and can begin to cure upon removal of a protective backing. The adhesive present on double-sided adhesive VHB™ tape manufactured by 3M® of St. Paul, Minn. is an exemplary adhesive.

The sealing membrane 60 can provide a seal between the substrate 20 and the light-shaping panel 40 when the adhesive surfaces 60p, 60d of the sealing membrane 60 bond with the substrate 20 and the light-shaping panel 40. For example, the sealing membrane 60 can hermetically seal the space between the substrate 20 and the light-shaping panel 40. In an exemplary embodiment, the sealing membrane 60 can seal the substrate 20 and the light-shaping panel 40 such that the optical system 10 conforms at least to the IP66 standard (e.g. IP68). By way of non-limiting example, the sealing membrane 60 can be configured to prevent dust and/or water from entering between the substrate 20 and the light shaping panel 40. In a preferred embodiment, the sealing membrane 60 can be configured to allow for the continuous immersion of the optical system 10 in water at least to a depth of 1 meter. With such a seal, the sealing membrane 60 allows the optical system 10 to be used in a variety of applications in a variety of environments. For example, the optical system 10 can be configured for use indoors, outdoors, and in aqueous environments without fear of intrusion of foreign particles between the substrate 20 and the light panel 40.

The sealing membrane 60 can be formed from any material that can seal the substrate 20 and light-shaping panel 40 when bonded therebetween. Although the sealing membrane 60 can be rigid, the sealing membrane is preferably formed of a compliant material that allows the sealing membrane 60 to be compressed between the substrate 20 and the light-shaping panel 40. Because of the material's compliance, the sealing membrane 60 can compensate for surface imperfections on the proximal surface 40p of the light-shaping panel 40 and/or the distal surface 20d of the substrate 20. Accordingly, a compliant sealing membrane 60 can provide a more uniform structure upon bonding of the components of the optical system 10. Additionally, a compliant sealing membrane 60 can improve the thermal coupling of the layers by ensuring contact between each element of the optical system 10, thereby improving the efficient transfer of heat (e.g., to a heat sink coupled to the optical system). In a preferred embodiment, the sealing membrane 60 comprises a foam. For example, the foam can be a closed-cell foam, and can be composed of acrylic. A suitable exemplary foam for use as the sealing membrane 60 includes double-sided adhesive VHB™ tape manufactured by 3M® of St. Paul, Minn.

The sealing membrane 60 can have a variety of configurations, shapes, and dimensions depending on the requirements of the optical system 10 and its intended use. For example, each of the one or more openings 62 of the sealing membrane 60 can substantially encircle a single light source 30, as shown in FIGS. 1-4. With this configuration, an individual seal can be formed between the substrate 20 and light-shaping panel 40 around each of the light sources 30. The seal can be configured such that the breach of a seal between the substrate 20 and light-shaping panel 40 around a single optic 50, for example, will not breach the seal around the remainder of the optics 50. Accordingly, any damage resulting from an accidental breach of part of the sealing membrane 60 can be limited (e.g., to a single light source 30) because the breach would not necessarily impact the seal formed by the sealing membrane 60 around the other light sources 30.

In one embodiment, the sealing membrane 60 can have a shape, aspect ratio, and nominal surface area, as defined above, that substantially corresponds to the nominal surface area and shape of the light-shaping panel 40 and the substrate 20 between which the sealing membrane 60 is disposed. In a preferred embodiment, the adhesive proximal and distal surfaces 60p, 60d of the sealing membrane 60 that are in contact with the light-shaping panel 40 and the substrate 20 can be configured to maximize the seal between the light-shaping panel 40, the substrate 20, and the sealing membrane 60. For example, the distal surface 60d of the sealing membrane 60 can be in contact with at least about 70%, 80%, 90%, or substantially the entire proximal surface 40p of the light-shaping panel 40, exclusive of the portions of the proximal surface 40p representing the recesses 52 which accommodate the light sources 30. It is nonetheless within the scope of the invention that the sealing membrane 60 can be in contact with a smaller area of the light-shaping panel 40, depending on the size, distribution, and concentration of light sources 30 and optics 50, so as not to interfere with the transmission of light from the light sources to the optics. As mentioned above, the sealing membrane 60 can also have any thickness, for example, between about 0.2 mm and about 0.8 mm (e.g., about 0.5 mm).

The optical systems described herein can include other features besides those discussed above. As shown in FIG. 5, the substrate 520 can be in thermal contact with a heat sink 580 to aid in the removal of heat from the substrate 520, light sources 530, sealing membrane 560, and light-shaping panel 540. The heat sink 580 can be directly in contact with the proximal surface 520p of the substrate 520, or alternatively, may be in thermal contact with the substrate 520 through a heat-conducting medium. By way of non-limiting example, an optical system 510 having a substrate 520 fabricated from fiberglass reinforced material can include, for example, grease, epoxy, a gap pad, or any other thermal interface material known in the art between the substrate 520 and the heat sink 580 so as to compensate for any surface variations that could hamper thermal contact therebetween. A thermal gap pad to aid in the thermal coupling of the substrate 520 and heat sink 580 can also be used, for example, when the substrate 520 is a PCB fabricated from a metal core substrate (e.g., containing aluminum).

As shown in FIG. 5, the sealing membrane 560 can include one or more bores 566 formed therein. The one or more bores 566 allow one or more fasteners to pass therethrough to secure the substrate 520 to the light-shaping panel 540. As will be appreciated by one of skill in the art, the fasteners can be any mechanism that facilitate the mechanical coupling of the substrate 520 to the light-shaping panel 540. For example, the fastener can be any of a screw, bolt, etc. for fastening the substrate to the light-shaping panel. By way of non-limiting example, the proximal surface 540p of the light-shaping panel 540 can include a male portion 546 extending proximally therefrom, the male portion 546 configured to pass through the bore 566 formed in the sealing membrane 560. The male portion 546 can be secured, for example, by interference fit or snap fit within a female port 526 formed in or through the substrate 520. Although the use of additional fasteners is not required to secure and seal the components of the optical system 510, the fasteners may provide the additional benefit of increasing the efficiency of heat transfer from the light-shaping panel 540 and substrate 520 to a heat sink positioned proximal to the proximal surface 520p of the substrate 520. In this manner, the fasteners can help secure the internal portions of an optical system (especially those having an aspect ratio close to 1 or with substantial internal surface area) and act as a heat stake to improve the transfer of thermal energy to the heat sink 580.

Figure 6:
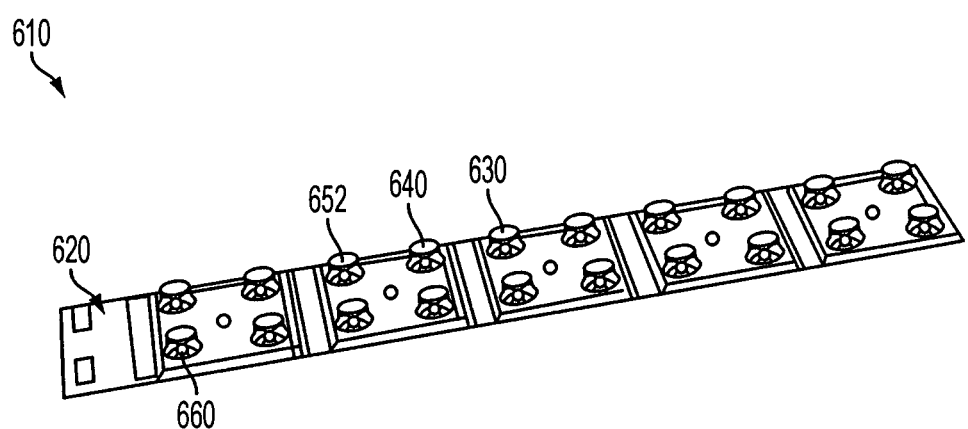
FIG. 6 is a perspective view of another exemplary embodiment of an optical system according to the teachings of the invention, which is suitable for use as the optic of FIG. 1 or as a stand-alone optic.

In an alternative embodiment of an optical system, shown in FIG. 6, an exemplary optical system 610 can include a PCB substrate 620 on which a plurality of light sources 630, e.g., light-emitting diodes, are mounted. A plurality of optically transparent or translucent covers 640 with appropriate receptacles 652 to accept the individual light sources 630 can be disposed over the substrate 620. In this exemplary embodiment, each cover 640 has four receptacles 652 (e.g., to create a "quad" cover), however virtually any other number of receptacles can be used for each cover. Each receptacle 652 can be configured as an optical element (e.g., a lens, reflector and so on) for its respective light source 630. The cover 640 can be attached to the PCB, e.g., via heat stake 646. As shown, an O-ring seal 660 can be included around the light source 630 and under the cover 640 to provide an environmental seal. In other embodiments, a seal (e.g., rectangular seal) around the perimeter of each quad cover 640 can be employed. In another embodiment, a sealing membrane, e.g., as described above can be used to individually seal each of said receptacles.

Other exemplary aspects of the invention are the methods and devices used to assemble the optical systems disclosed herein (e.g. to couple the light-shaping panel 40 and the substrate 20 to the sealing membrane 60). Again referring to FIGS. 1-4, assembling the optical systems disclosed herein requires bonding the adhesive surfaces 60*p*, 60*d* of the sealing membrane 60 with the substrate 20 and the light-shaping panel 40. As discussed above, the substrate 20 can include one or more light sources 30 disposed thereon. The light-shaping panel 40 can include one or more optics 50. The substrate 20 and the light-shaping panel 40 can be aligned such that the optics 50 are optically aligned with a corresponding light source 30. A sealing membrane 60 having preformed openings 62 corresponding to the locations of the light sources 30 and the optics 50 can be placed between the substrate 20 and light-shaping panel 40. Alternatively, the openings 62 in the sealing membrane 60 can be cut or punched after determining the appropriate locations by aligning the sealing membrane 60 between the substrate 20 and the light-shaping panel 40. Adhesive can be applied to the proximal and distal surfaces 60*p*, 60*d* of the sealing membrane 60. Alternatively, the proximal and distal surfaces 60*p*, 60*d* with adhesive already disposed thereon can be exposed, for example, by removing a protective backing from the surfaces. After aligning the light sources 30 with their respective openings 62, the sealing membrane 60 and the substrate 20 can be pressed together to bond the surfaces so as to form a seal. After aligning the optics 50 with their respective openings 62, the sealing membrane 60 and the light-shaping panel 40 can be pressed together to bond the surfaces so as to form a seal. In another embodiment, the light sources 30, openings 62, and optics 50 can be simultaneously aligned such that the substrate 20, sealing member 60, and light-shaping panel 40 can be compressed and bonded in a single step.

The optical system can be assembled using a press. The press can allow for accurate placement of the light-shaping panel 40, sealing membrane 60, and substrate 20. The press can provide even pressure for sealing the components together. The press can provide both alignment and rapid placement of the various components to facilitate low cost manufacturing. In a preferred embodiment, the optical system 10 can be assembled using the hydraulic press 1500, shown in FIGS. 15-16. The hydraulic press 1500 can include a base 1502, one or more hydraulic rams 1504, an inferior plate 1510, and a superior plate 1520.

Figure 16:
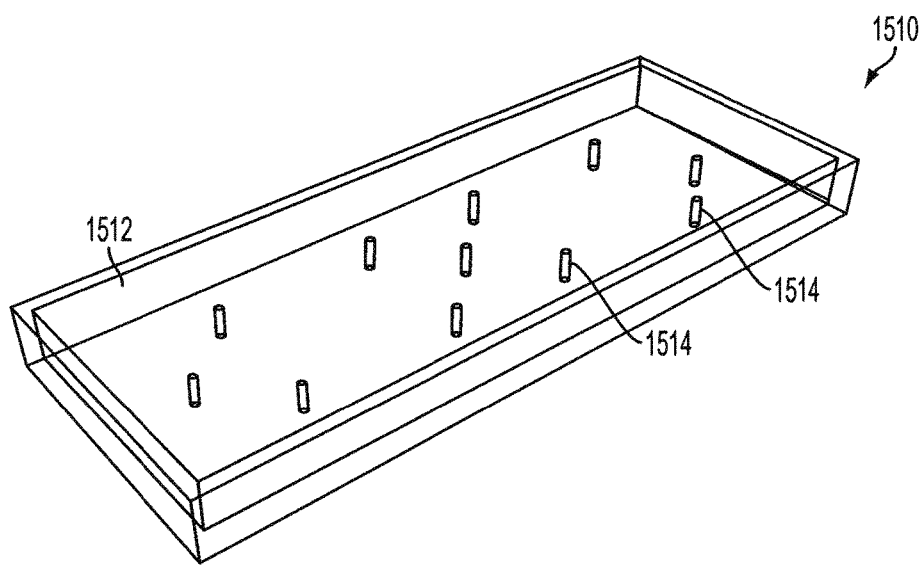
FIG. 16 is a perspective view of the inferior plate of the press of FIG. 15.

The inferior plate 1510 can be attached to the base 1502 to provide a stable surface on which to assemble the optical system 10. The inferior plate 1510 can include a substantially planar superior surface 1512 on which to place a component of the optical system 10 to be assembled. The superior surface 1512 can include one or more registers to aid in the alignment of the components of the optical system 10. As shown in FIG. 16, the registers can be pins 1514 that correspond to holes (not shown) formed in the element of the optical system 10 to be coupled. The pins 1514 can be spring-loaded, for example, to recede within the superior surface 1512 of the inferior plate 1510 when the press 1500 is actuated such that the pins 1514 do not interfere with the compression of the elements to be bonded. The one or more pins 1514 can be of different sizes, for example, such that each of the pins 1514 corresponds to a particular component to be placed on the superior surface 1512 of the inferior plate 1510. Alternatively, the superior surface 1512 of the press can include holes which correspond to pins extending from the surface of the component to be bonded.

Figure 15:
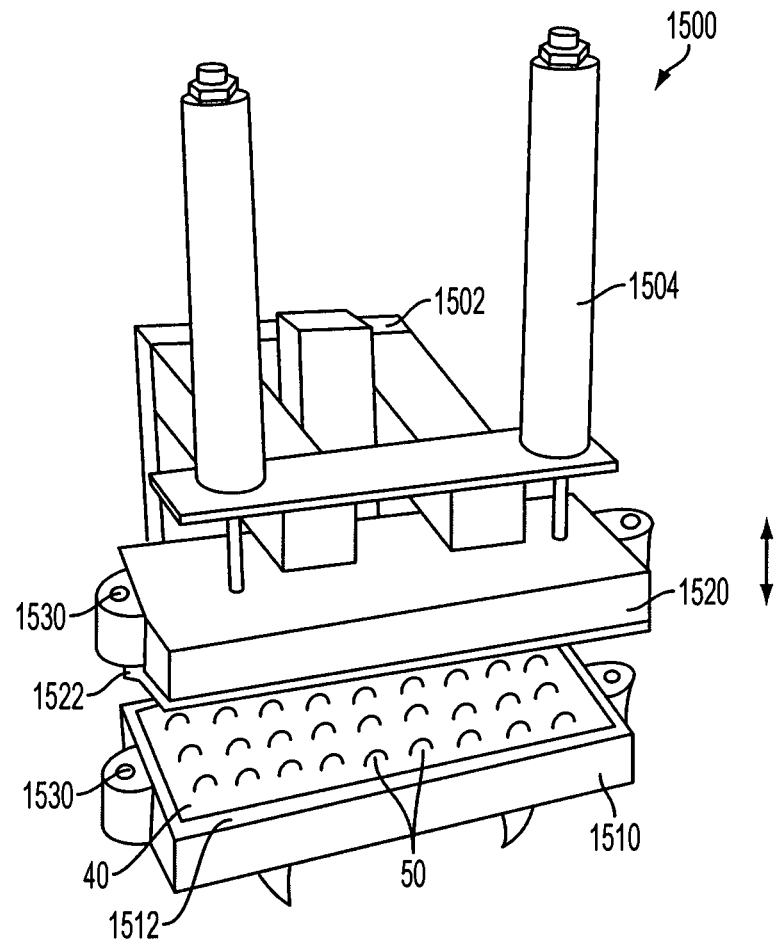
FIG. 15 is a perspective view of an exemplary embodiment of a press according to the teachings of the invention.

The superior plate 1520 can be coupled to the one or more hydraulic rams 1504 such that actuation of the hydraulic rams 1504 is effective to cause vertical movement of the superior plate 1520 relative to the inferior plate 1510 (as indicated by the arrow in FIG. 15). The superior plate 1520 can include an inferior surface that can be substantially planar. In preferred embodiments, however, the inferior surface of the superior plate 1520 can define a cavity capable of coupling to an insert 1522. Preferably, the inferior surface of the insert 1522 can be formed to correspond to at least a portion of a particular component of the optical system 10 (e.g., the distal surface 40*d* of the light-shaping panel 40), such that when the hydraulic rams 1504 are actuated, the insert 1522 presses the particular component of the optical system 10 disposed therebelow without damaging the component.

The inferior and superior plates 1510, 1520 can optionally define alignment holes 1530. The alignment holes 1530 can be used to ensure that the inferior and superior plates 1510, 1520 are properly aligned prior to actuating the hydraulic rams 1504 to compress the optical components disposed between the inferior and superior plates.

The hydraulic rams 1504 can be coupled to the superior plate 1530. Once coupled, the hydraulic rams 1504 can be extended and retracted to lower and raise, respectively, the superior plate 1520 relative to the inferior plate 1510. The hydraulic rams 1504 can move the superior plate 1520 between an open position, as shown in FIG. 15, and a closed position, in which the components of the optical system 10 disposed between the superior and inferior plates 1510, 1520 are compressed.

In an alternative embodiment (not shown), hydraulic rams can be coupled to the inferior plate 1510 such that actuation of the hydraulic rams results in vertical movement of the inferior plate. In such an alternative embodiment, the inferior plate 1510 can be movably coupled to the base 1502 through the hydraulic rams such that the inferior plate 1510 on which a component of the optical system 10 is disposed is raised towards the superior plate (which can either be fixedly attached to the base 1502, or movably coupled to the base 1502, as described above).

In one embodiment, the optical system 10 can be assembled using the press 1500 by initially positioning the superior plate 1520 in an open position. The proximal surface 60*p* of the sealing membrane 60 can be placed on the superior surface 1512 of the inferior plate 1510. The sealing membrane 60 can be aligned by registering and coupling one or more pins 1514 with one or more holes formed in the sealing membrane 60. A protective backing can be removed from the sealing membrane 60 to expose the distal surface 60*d* with adhesive disposed thereon. The light-shaping panel 50 can then be placed over and on the sealing membrane 60 such that the proximal surface 40*p* of the light-shaping panel 40 is in contact with the distal surface 60*d* of the sealing membrane 60 (with adhesive exposed). The light-shaping panel 40 can be aligned or registered to one or more pins 1514 configured to couple to holes (not shown) on the proximal surface 40*p* of the light-shaping panel 40. After properly aligning the sealing membrane 60 and the light-shaping panel 40, the hydraulic arms 1504 can be actuated to lower the superior plate 1520 to compress the light-shaping panel against the sealing membrane and bond the contacting surfaces 40*p*, 60*d*. The hydraulic arms 1504 can then be actuated to return to the open position. The sealing membrane 60 and light-shaping panel 40, now coupled, can then be removed from the inferior plate 1510. A substrate 20 can then be disposed on the superior surface 1512 of the inferior plate 1510 such that the distal surface 20*d* faces the superior plate 1520. The substrate 20 can be aligned by registering one or more pins 1514 of the inferior plate 1510 with one or more holes formed in the proximal surface 20*p* of the substrate 20. A protective backing can be removed from the proximal surface 60*p* of the sealing membrane 60 to expose the adhesive disposed thereon. The sealing membrane 60 can then be placed over and on the substrate 20 such that the proximal surface 60*p* of the sealing membrane 60 (with the adhesive exposed) is in contact with the distal surface 20*d* of the substrate 20. The sealing membrane 60 can be aligned or registered to one or more pins 1514 configured to couple to holes (not shown) on the proximal surface 60*p* of the sealing membrane 60. After properly aligning the substrate 20 and the sealing membrane 60, the hydraulic arms 1504 can be actuated to lower the superior plate 1520 to compress the sealing membrane against the substrate 20 and bond the contacting surfaces 20*d*, 60*p*. The hydraulic arms 1504 can then be actuated to return to the open position.

Figure 17:
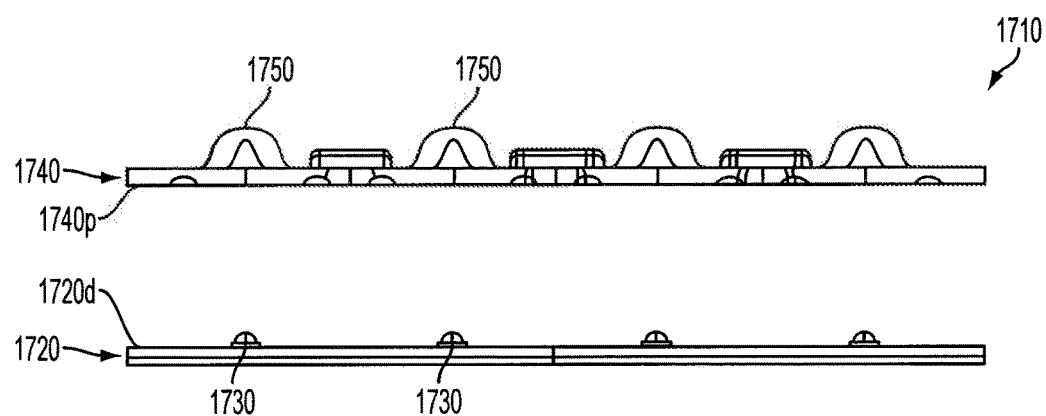
FIG. 17 is an exploded side view of another exemplary embodiment of an optical system.

In an alternative embodiment of an optical system, an exemplary optical system 1710 can include a PCB substrate 1720 (having a plurality of light sources 1730 disposed thereon) and a light-shaping panel 1740 (including a plurality of optics 1750) as shown in FIG. 17. The optical system 1710 is similar to the optical system 10 depicted in FIGS. 1-4, except for the lack of a sealing membrane disposed between the substrate 1720 and the light-shaping panel 1740. A distal surface 1720*d* of the substrate 1720 and a proximal surface 1740*p* of the light-shaping panel 1740 can be coupled to one another by any means known in the art, for example, by adhesive or mechanical coupling. By way of non-limiting example, fasteners (e.g., screws, bolts, etc.) can be used for fastening the substrate to the light-shaping panel.

Although a variety of optics will be discussed in detail below, the particular configurations described herein are not intended to limit the wide variety of optical elements that can be used in conjunction with the light-shaping panel 40. Rather, the following description is merely intended to provide exemplary optics for providing a desired light distribution. The optics discussed below can also find application individually, as stand-alone optics outside of their use in the optical systems described herein.

Figure 7:
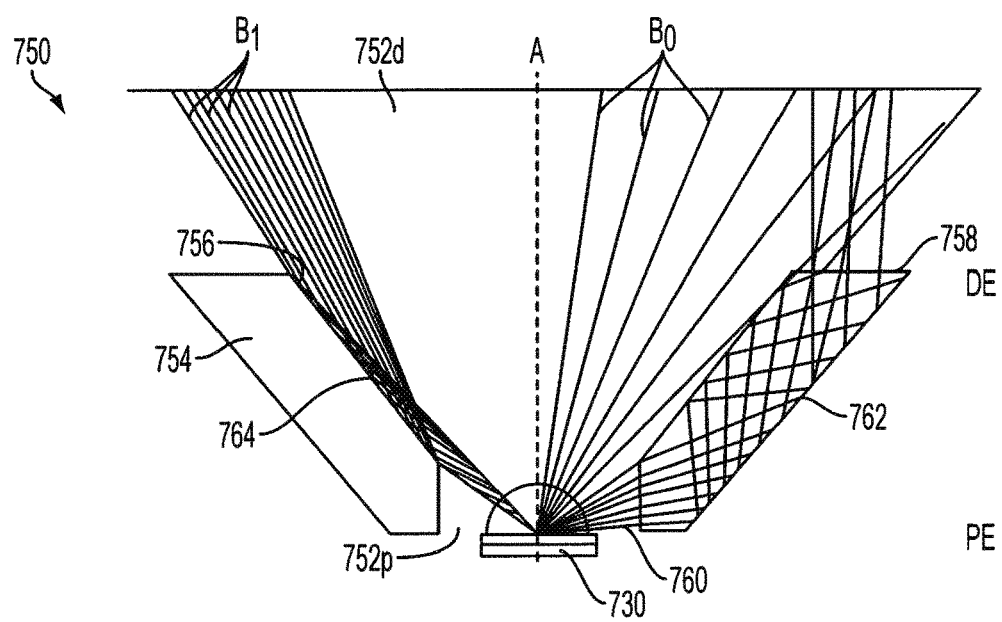
FIG. 7 is a side view of another exemplary embodiment of an optic according to the teachings of the invention, which is suitable for use as the optic of FIG. 1 or as a stand-alone optic.

FIG. 7 schematically depicts, in cross-section, an optical device 750 (herein also referred to as an optic) which can be incorporated into the light-shaping panel described above, or used in other applications. The optic 750 includes an optic body 754 disposed about an optical axis (A), which extends from a proximal end (PE) to a distal end (DE). The proximal end includes an opening 752*p* for receiving light from a light source 730, such as a light-emitting diode (LED) or otherwise. While in this exemplary implementation the light source 730 is at least partially disposed in the opening 752*p*, in other implementations the light source can be disposed external to the optic 750 with the opening 752*p* receiving light therefrom. Further, while in this implementation the light source 730 is positioned on the optical axis (A), in other implementations it can be positioned at a location that is offset relative to the optical axis.

The optic 750 passes a portion of the light directly from the proximal end to the distal end, redirects another portion of the light via specular reflection (e.g., via a single specular reflection off an external facet of an inner reflective surface 756 to the distal end), and redirects yet another portion of the light via one or more reflections within the optic body 754 (at least some of which are total internal reflections) to an output surface 758 at the distal end.

For example, a portion of the light emitted by the source 730 travels from the proximal end to the distal end to leave the optic 750 via the distal opening 752*d* without encountering the optic body 754.

The inner reflective surface 756 of the optic, or a facet thereof, receives another portion of the source light directly (such as exemplary ray bundle B1). The inner reflective surface 756 specularly reflects that light, redirecting it to leave the optic though an opening 752*d* at the optic's distal end. By way of example, in some implementations the inner reflective surface 756 is coated with a metallic layer (e.g., a layer formed of aluminum or silver) that specularly reflects light incident on that surface, which in this example is received directly from the light source 730.

An input surface 760 on the optic 750 receives yet another portion of the light emitted from the light source 730 and refracts that light as it enters the optic body 754. In this embodiment, the optic body 754 forms a light pipe that transfers source light from the input surface 760 to the output surface 758 via total internal reflection. More specifically, the light entering the optic body 754 through the input surface 760 undergoes at least one total internal reflection at an outer reflective surface 762, which is shaped, positioned, and/or otherwise configured to reflect incident light via total internal reflection (TIR). In many embodiments, that light undergoes successive total internal reflections as it travels back and forth between an outer reflective surface 762 and an interior side 764 of the inner reflective surface 756, which is referred to herein for convenience as the "backside" of the inner reflective surface 756. After undergoing some number of successive reflections between the backside 764 and the outer reflective surface 762, the light reaches the output surface 758, through which it exits the optic body 754. In many cases, the output surface 758 can be oriented substantially perpendicular to the optical axis (A) so that light exiting therefrom undergoes negligible change of direction as it is refracted out of the optic body 754.

As is known in the art, total internal reflection can occur at an interface between two media having different indices of refraction when the light traversing the medium having the larger index is incident on the interface at an angle relative to a normal to the interface that exceeds a critical angle, which can be defined by the following relation:

$$\theta_{crit} = \arcsin\frac{n_2}{n_1}$$

where $n_1$ is the refractive index of the medium having the larger index and $n_2$ is the refractive index of the medium having the lower refractive index.

The refractive index of the material forming the optic body 754, the profile of the outer reflective surface 762 as well as the position of the light source 730 relative to the input surface 760 are chosen in a manner known in the art such the majority, and preferably all or substantially all (e.g., at least about 80% or at least about 90%, or more), of the light rays from the light source 730 entering the optic body through the input surface 760 are incident on the outer reflective surface 762 at an incident angle relative to a vector normal to the surface that exceeds the critical angle for total internal reflection, and hence undergo total internal reflection at the outer reflective surface 762 to be directed to the backside 764. The rays are then reflected at the backside 764 toward the outer reflective surface 762 to be reflected again. In this manner, the light entering the optic body 754 undergoes multiple successive reflections at the outer and the inner surfaces to reach the output surface 758.

In one implementation, for example, the outer reflective surface 762 and the inner reflective surface 756 (and, hence, the opposing backside 756) are arranged to be parallel to one another and can be oriented, for example, at an angle of about 30 to about 60 degrees relative to the optical axis (A). The input surface 760 is parallel, or substantially parallel to the optical axis (A), while the output surface 758 is perpendicular, or substantially so, to the optical axis (A). Those skilled in the art, however, will understand that the foregoing is merely a non-limiting example of design parameters and that a wide variety of configurations are in accord with the teachings herein.

With the foregoing optical mechanism, the optic 750 redirects light emitted by the light source 730 onto a target surface with a desired lighting pattern. The optic 750 provides a number of advantages. For example, the inner reflective surface 756 helps define the edge of the lighting pattern, and the outer TIR reflective surface 762 helps control the uniformity of the lighting pattern. Moreover, the passage of some of the light (ray bundle $B_O$) emitted by the light source 730 though the central portion of the optic 750 without encountering the optic body 754 minimizes an optical loss exhibited by the optic 750.

In this exemplary embodiments, the profiles of the inner and the outer reflective surfaces can be characterized as truncated conical surfaces. In other embodiments, these surfaces can be shaped differently to achieve a desired illumination pattern.

Figure 8:
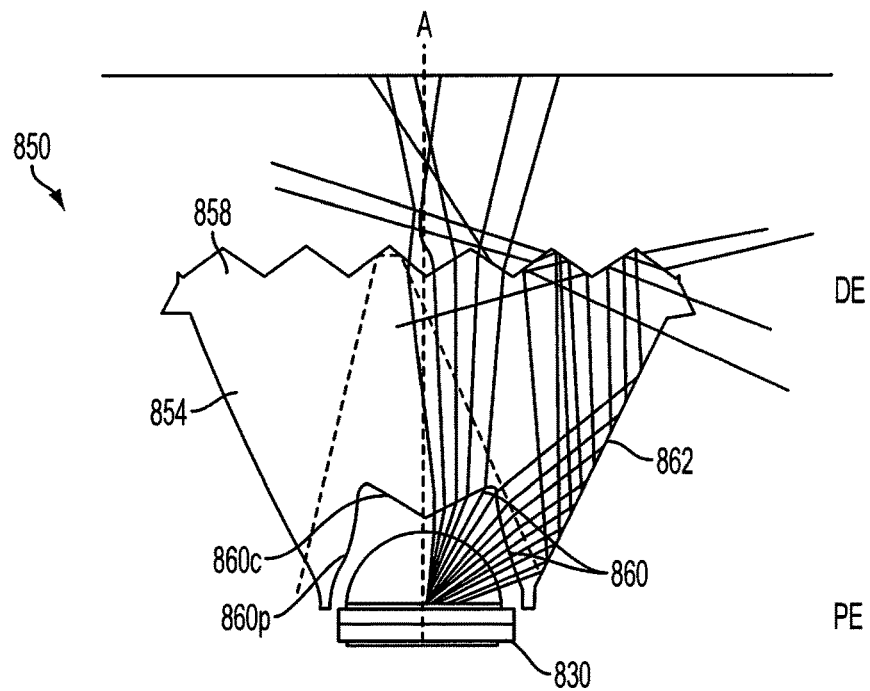
FIG. 8 is a side view of another exemplary embodiment of an optic according to the teachings of the invention, which is suitable for use as the optic of FIG. 1 or as a stand-alone optic.

FIG. 8 schematically depicts another embodiment of an optical device that can be incorporated into the light-shaping panel described above. The optic 850 includes an optic body 854 extending between a proximal end (PE) and a distal end (DE) along an optical axis (A). The optic body 854 is defined by an input surface 860 adapted for receiving light from a light source 830, an output surface 858 through which light exits the optic body 854, and a lateral surface 862 extending between the input and output surfaces 860, 858. The input surface 860 is defined by a cavity with a central portion 860c and a peripheral portion 860p. The central portion 860c presents a convex surface to light from the light source 830 and refracts and redirects that light to the output surface 858. The peripheral portion 860p refracts and redirects light received from the light source 830 to the lateral surface 862, which is configured to totally internally reflect all or substantially all of that light and thereby redirect it to the output surface 858. The output surface 858 refracts light as it leaves the optic body 854 and travels to the external environment. In this implementation, a prismatic array is formed on the output surface 858 to diffuse the exiting light.

Figure 9:
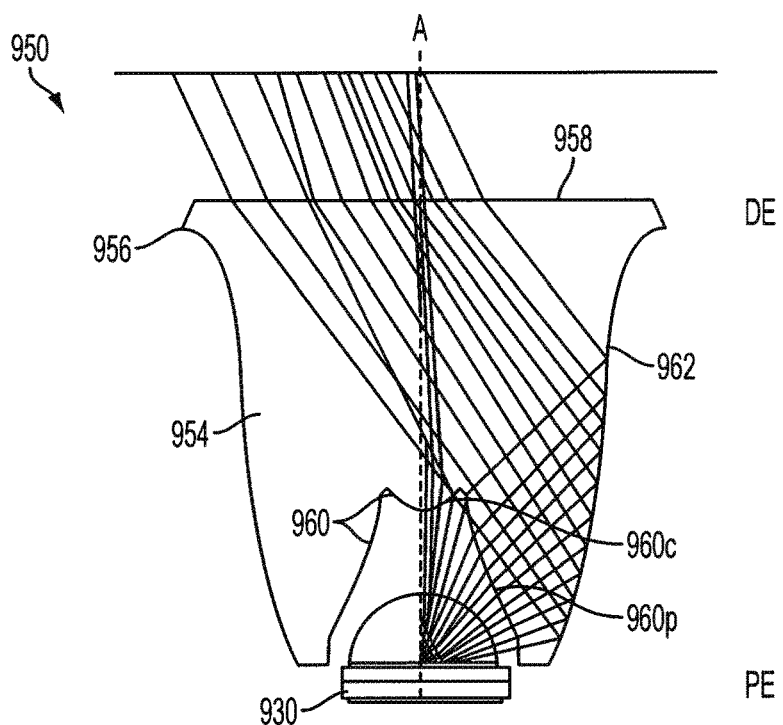
FIG. 9 is a side view of a of another exemplary embodiment of an optic according to the teachings of the invention, which is suitable for use as the optic of FIG. 1 or as a stand-alone optic c.

FIG. 9 depicts an optic 950 according to another embodiment, which includes an optic body 954 extending from a proximal end (PE) to a distal end (DE) and is disposed about an optical axis (A). The optic body 954 includes an input surface 960 that is adapted to receive light from a light source 930, such as an LED, and an output surface 958 through which the light exits the optic body 954 into the external environment. The optic body 954 further includes a lateral surface 962 that extends between the input surface 960 and the output surface 958.

The input surface 960 includes a central portion 960c and a peripheral portion 960p, which collectively form the wall of a cavity into which at least a portion of the light source 930 can be disposed. The central portion 960c of the input surface 960 is adapted to refract the light received from the light source 930 into the optic body 954 such that the light will traverse the optic body 954 without encountering the peripheral surface 962 to reach the output surface 958. The light reaching the output surface 958 is then refracted by that surface to exit the optic body 954. The peripheral portion 960p of the input surface 960 is in turn adapted to refract the light from the light source 930 incident thereon into the optic body 954 toward the lateral surface 962. As discussed in more detail below, the lateral surface 962 in turn reflects the light incident thereon, or at least a substantial portion of the incident light, via total internal reflection (TIR) toward the output surface 958 through which the light exits the optic body 954.

In this implementation, the central portion 960c of the input surface 960 has a convex profile. The peripheral portion 960p of the input surface 960 in turn includes a distal concave segment and a proximal convex segment that form a smooth surface extending from the proximal end of the input surface to its distal end.

The shape of the peripheral portion 960p of the input surface 960 as well as that of the lateral surface 962 of the optic 950 together with positioning of the light source 930 relative to the optic 950 and the index of refraction of the material forming the optic 950 can be selected in a manner known in the art such that a substantial portion, and preferably all of, the light rays that reach the lateral surface 962 via refraction at the peripheral portion 960p of the input surface 960 would undergo total internal reflection at the lateral surface 962. By way of example, in some implementations, more than about 80%, e.g., more than about 90% or 95%, and preferably 100%, of the light energy incident on the lateral surface 962 via entry into the optic body 954 through the peripheral portion 960p of the input surface 960 undergoes total internal reflection at the lateral surface 962. The light reflected at the lateral surface 962 then exits the optic body 954 via refraction at the output surface 958.

In this implementation, the lateral surface 962 includes a substantially concave portion and a substantially convex portion that together form a smooth surface. The substantially concave portion extends from the distal end of the optic 950 to the substantially convex portion, and forms the majority of the lateral surface 962.

In this embodiment, the output surface 958 is substantially flat, though in other embodiments the output surface 958 can be configured to include corrugations. Further, the optic 950 includes a lip 956 surrounding the output surface 958, e.g., to facilitate positioning of the optic 950 into a holder or sealing the optic 950 into a light-shaping panel. In other embodiments the lip 956 can be omitted.

Figure 10:
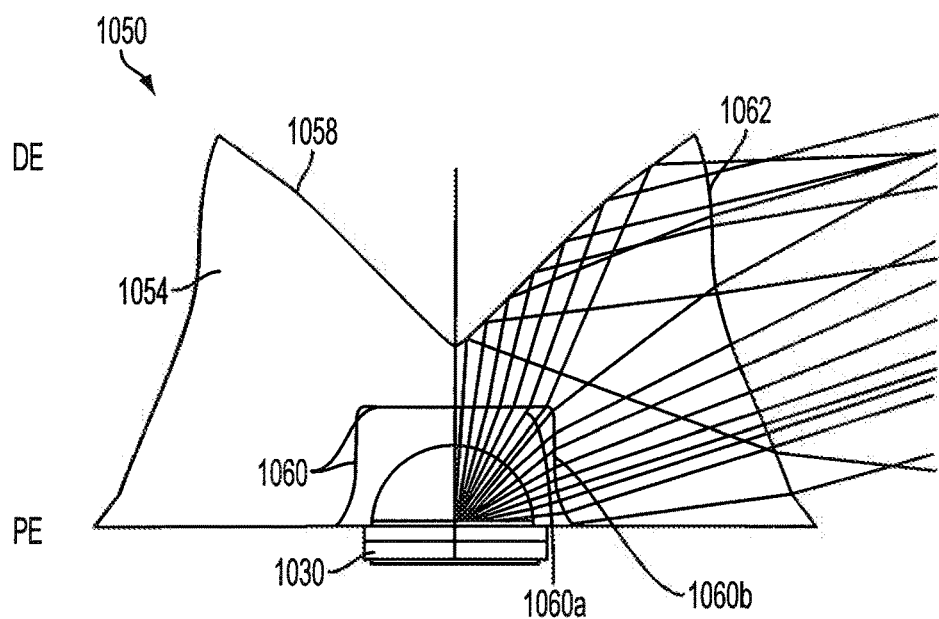
FIG. 10 is a side view of another exemplary embodiment of an optic according to the teachings of the invention, which is suitable for use as the optic of FIG. 1 or as a stand-alone optic.

FIG. 10 schematically depicts another embodiment of an optic 1050 which is configured as a side-emitter. In some implementations, for example, the optical device 1050 can emit all or a substantially all (e.g., at least about 80% or at least about 90%, or more) of received source light at a high angle (e.g., 60 degrees, 75 degrees, or more) relative to the optical axis (A), and can also emit all or substantially all of the received source light through its substantially concave lateral surface 1062.

The optic 1050 has an optic body 1054 that extends between a proximal end (PE) and a distal end (DE) along an optical axis (A). The optic body 1054 is defined by an input surface 1060, which has a recess or cavity formed therein for receiving light from the light source 1030, as well as a distal surface 1058, which is recessed at the optical axis (A) to enable total internal reflection on its inner side, as discussed in more detail below. The lateral surface 1062 extends between the input and distal surfaces 1060, 1058 and may include one or more facets.

In this embodiment, the input surface 1060 has a distal wall 1060b and a sidewall 1060a which meet at or near a fight angle. The distal wall 1060b of the input surface 1060 receives light from the light source 1030 and passes it to the interior side of the posterior surface 1058. In this case, the distal wall 1060d is designed to pass the light without change of direction, although some rays may be refracted and change direction, particularly near the intersection of the distal wall 1060b and sidewall 1060a. In this embodiment, all or substantially all of the light traveling from the distal wall 1060b of the input surface 1060 to the interior side of the posterior surface 1058 is totally internally reflected at that location. The total internal reflection of the light redirects it out of the optical device via at least one facet of the lateral surface 1062.

The sidewall 1060a of the input surface 1060 refracts light as it enters the optic body 1054 and passes it to at least one facet of the lateral surface 1062 (e.g., which can be the same or a different facet of the lateral surface from that mentioned immediately above). In this case, the sidewall 1060a is designed to pass the light without change of direction, although some rays may be refracted and change direction, particularly near the intersection of the distal wall 1060b and sidewall 1060a.

Figure 11:
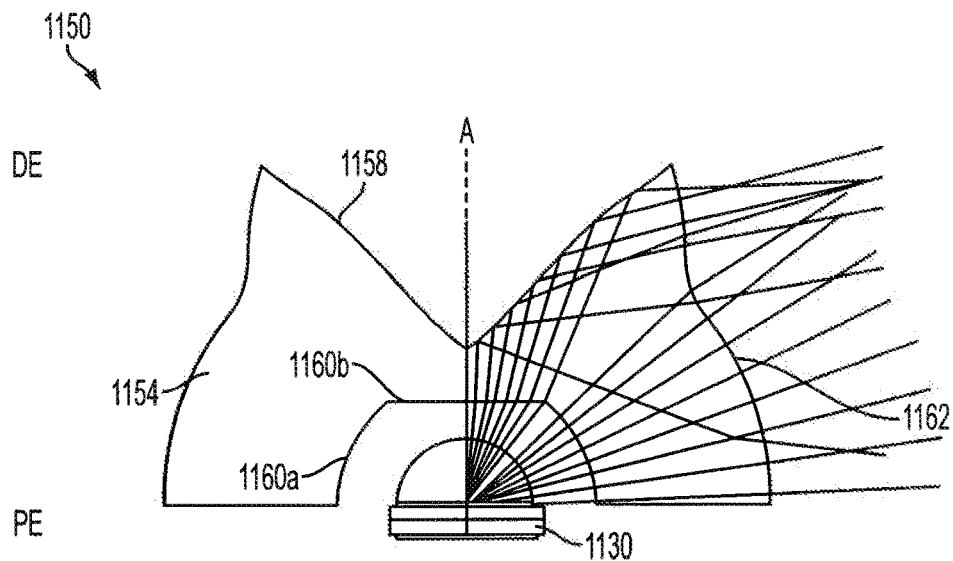
FIG. 11 is a side view of another exemplary embodiment of an optic according to the teachings of the invention, which is suitable for use as the optic of FIG. 1 or as a stand-alone optic.

FIG. 11 depicts an optic 1150 similar to optic 1050 of FIG. 10. The optic 1150 has an optic body 1154 that extends between a proximal end (PE) and a distal end (DE) along an optical axis (A). The optic body 1154 is defined by an input surface 1160, which has a recess or cavity formed therein for receiving light from the light source 1130, as well as a distal surface 1158, which is recessed at the optical axis (A) to enable total internal reflection on its inner side. The lateral surface 1162 extends between the input and distal surfaces 1160, 1158 and may include one or more facets. However, in this embodiment, the input surface 1160 has a distal wall 1160b and a concave sidewall 1160a. The optic 1150 also differs from the optic 1050 of FIG. 10 in that the lateral surface includes a substantially straight portion and a substantially convex portion. The substantially convex portion extends from the proximal end of the optic 1150 to the substantially straight portion, and forms the majority of the lateral surface 1162.

Figure 12:
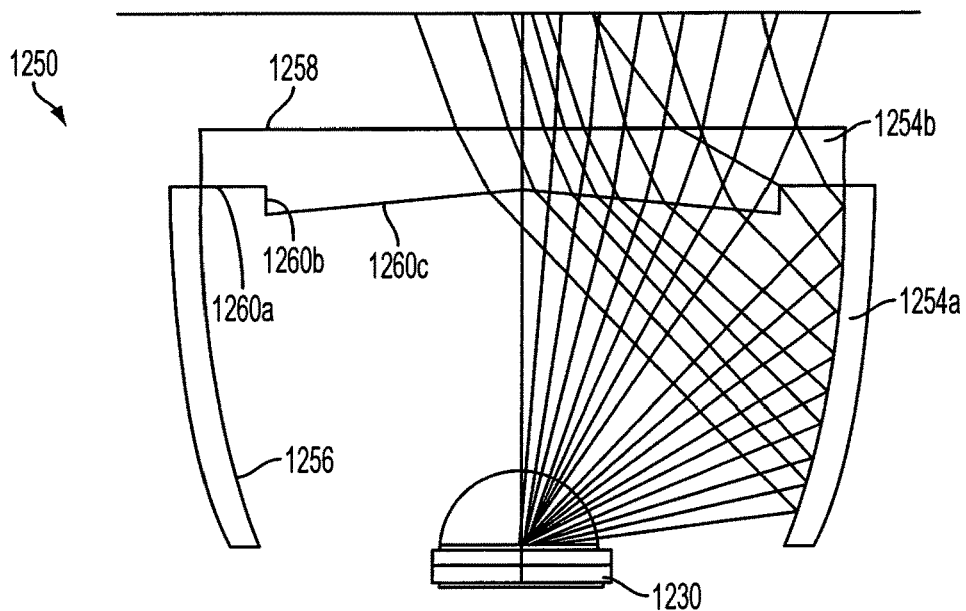
FIG. 12 is a side view of another exemplary embodiment of an optic according to the teachings of the invention, which is suitable for use as the optic of FIG. 1 or as a stand-alone optic.

FIG. 12 schematically depicts an optic 1250 according to another embodiment, which includes a reflector 1254a having a proximal end (PE) and a distal end (DE) and being optically coupled to a light source at its proximal end. The reflector 1254a includes a specularly reflective surface 1256 (e.g., formed by depositing a thin layer of a metal, such as silver, on that surface) that reflects the incident light toward the distal end of the reflector 1256.

The optic 1250 further includes an optical element 1254b that is disposed across the distal end of the reflector 1254a to receive the light reflected by the reflective surface 1256. The optical element 1254b includes an optic body having an input surface 1260 that refracts the light incident thereon into the optic body and an output surface 1258 through which the light exits the optic body. In this implementation, the input surface 1260 includes a central portion 1260c that is surrounded by an annular portion 1260a. A vertical wall 1260b joins the central portion 1260c to the annular portion 1260a. While the annular portion 1260a is substantially flat, the central portion 1260c has a slight concave curvature. The output surface 1258 is also flat, though in other implementations it can be curved, e.g., so as to provide a focusing power.

In use, a portion of the light emitted by the light source 1230 travels directly to the optic 1254b and is refracted by the input surface 1260 to enter the optic body of the optic 1254b. The light then traverses the optical element 1254b to reach the output surface 1258 at which it refracts to exit the optical element 1254b. Another portion of the light emitted by the light source 1230 is directed to the reflective surface 1256 of the reflector 1254a at which it is reflected toward the optic 1254b. Upon reaching the optic 1254b, the reflected light is refracted at the input surface 1260 to enter the optic body of the optic 1254b, and traverses the optic body to reach the output surface 1258 at which it is refracted to exit the optic 1254b.

In this manner, the optic 1250 can direct the light emitted by the source 1230 via a combination of reflection and refraction onto a target surface. While the reflective surface 1256 reflects the incident light into higher angles, the refractive element helps improve the illumination uniformity.

Figure 13A:
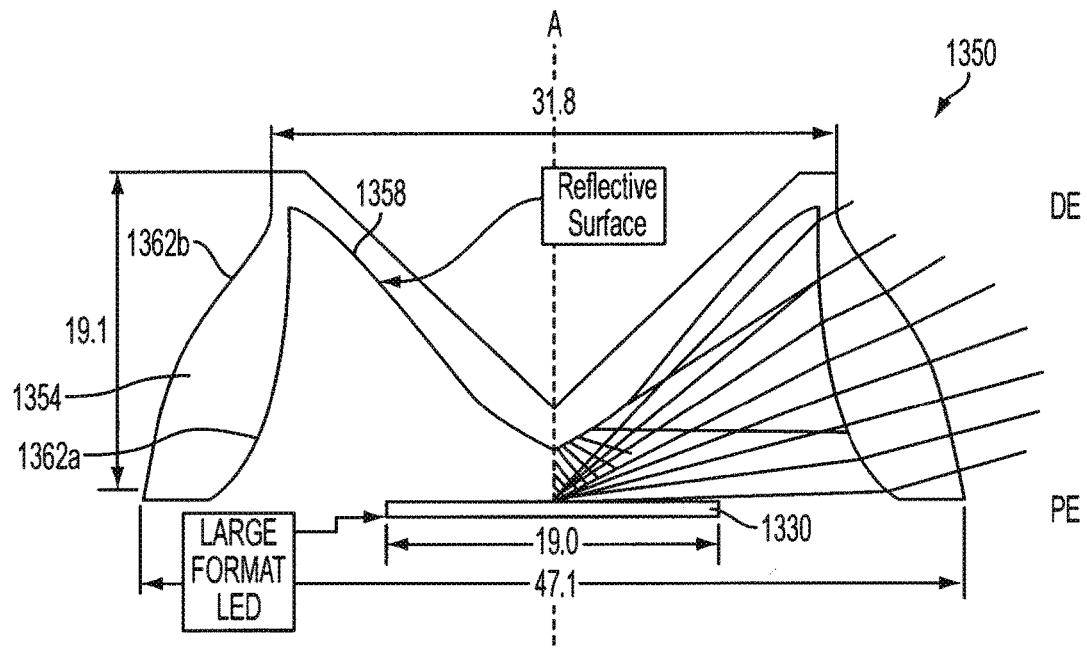
FIG. 13A is a side view of another exemplary embodiment of an optic with a large format LED as the light source, which schematically depicts the path of the light rays emanated from the center of the LED.
Figure 13B:
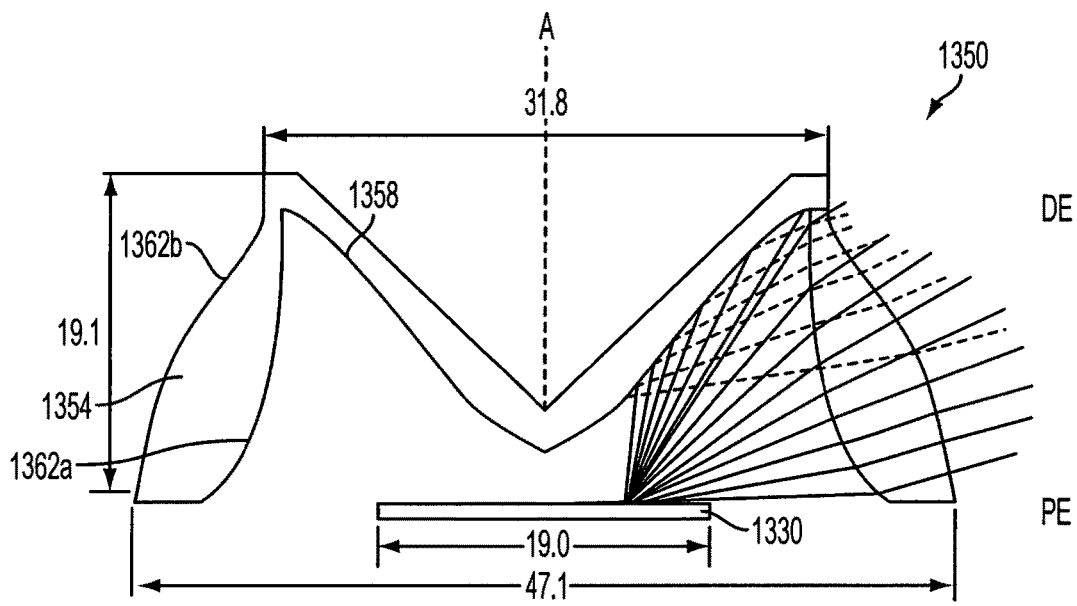
FIG. 13B is another side view of the optic of FIG. 13A with a large format LED as the light source, which schematically depicts the path of the light rays emanated from a point offset from the center of the LED.
Figure 13C:
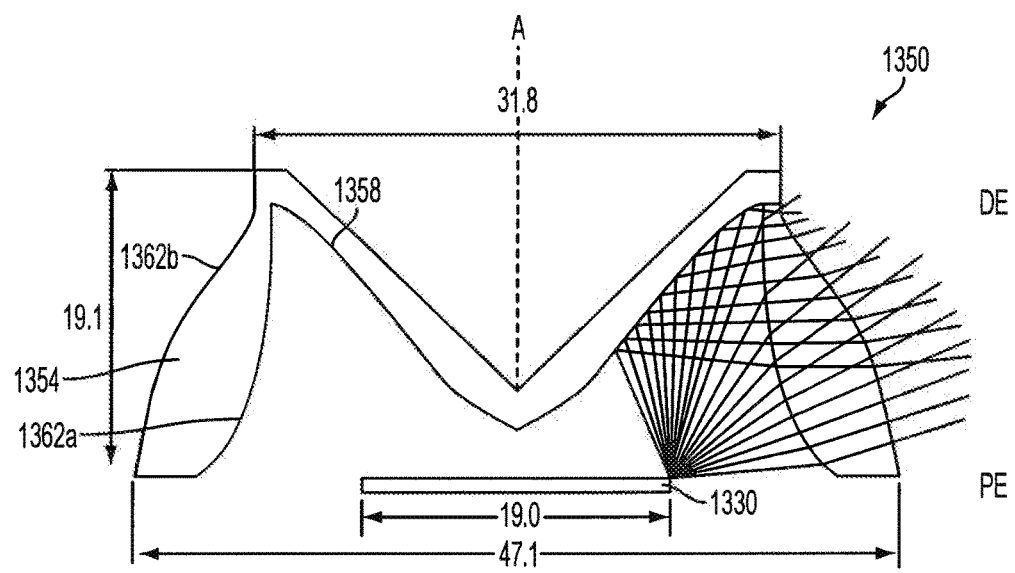
FIG. 13C is another side view of the optic of FIG. 13A with a large format LED as the light source, which schematically depicts the path of the light rays emanated from an edge of the LED.

FIGS. 13A-C schematically depict another embodiment of a side-emitting optic 1350 for use with a large format LED, along with non-limiting examples of dimensions associated therewith. FIGS. 13A-C additionally depict the ray trace of light generated at the center, midpoint, and edge of the large format LED, respectively. The optic 1350 has an optic body 1354 that extends between a proximal end (PE) and a distal end (DE) along an optical axis (A). The optic 1350 includes a reflector 1358 and a peripheral optical element 1354, which are joined at the distal end of the optic 1350 and can be formed (e.g., molded) as one component. In alternate embodiments, however, the reflector 1358 and peripheral optical element 1354 can be manufactured as separate components.

The reflector 1358 presents a convex specularly reflective surface to the light source 1330, tapering proximally to a point (P) on the optical axis (A). The reflector 1358 reflects light from the light source 1330, redirecting it away from the optical axis (A) to a peripheral optical element 1354. The peripheral optical element 1354 (e.g., a lens with a focusing power, or other element) receives that reflected light, as well as light traveling directly thereto from the light source 1330, at an input surface 1362a. In this embodiment, the input surface 1362a of the peripheral optical element 1354 is spaced apart from and facing the reflector 1358.

The light enters the peripheral optical element 1354 at its input surface 1362a and exits the peripheral optical element 1354 at its output surface 1362b. The input and output surfaces 1362a, 1362b can refract that light and thereby redirect it, pass the light without redirection, or otherwise.

Figure 14A:
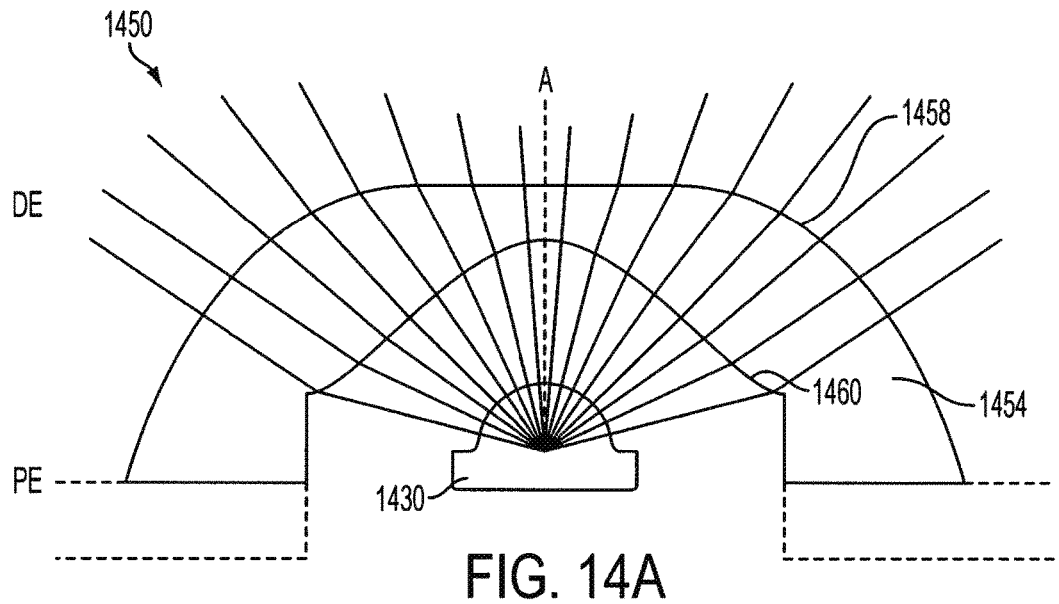
FIG. 14A is a side view of another exemplary embodiment of an optic, which schematically depicts the paths of exemplary rays emanating from a light source through the optic.
Figure 14B:
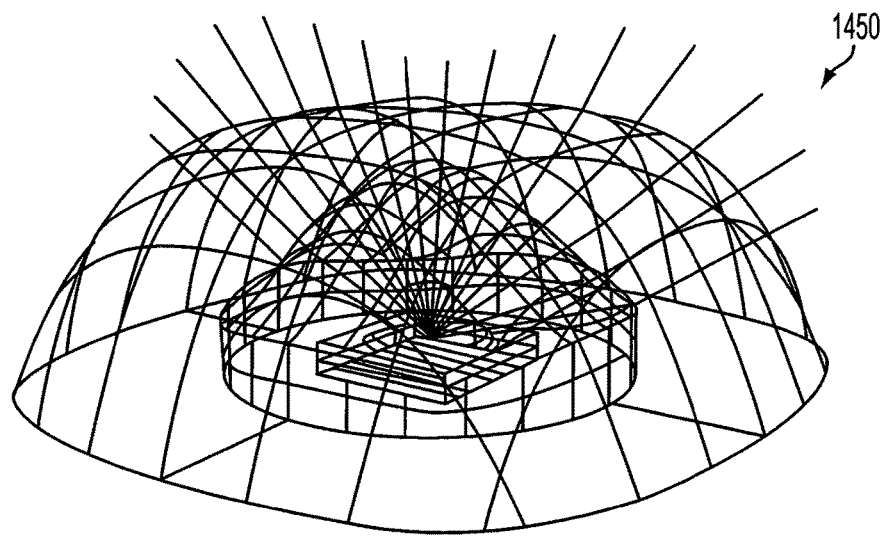
FIG. 14B is a contoured perspective view of the optic of FIG. 14A.

FIGS. 14A-B schematically depict another embodiment of an optical device that can be incorporated into the light-shaping panel described above. The optic 1450 includes an optic body 1454 extending between a proximal end (PE) and a distal end (DE) along an optical axis (A). The optic body 1454 is defined by an input surface 1460 adapted for receiving light from a light source 1430 and an output surface 1458 through which light exits the optic body 1454. The input surface 1460 defines a cavity into which the light source 1430 can extend. The input surface 1460 presents a substantially concave surface to light from the light source 830 and can refract and redirect the light to the output surface 1458. As best shown in FIG. 14A, the proximal portion of the input surface 1460 can be straight or even slightly convex. The output surface 1458 refracts light as it leaves the optic body 1454 and travels to the external environment. In three-dimensions, the input surface 1460 can be, for example, rotationally symmetric relative to the optical axis (A) and the output surface 1458 can have, for example, bilateral symmetry such that the output surface 1460 resembles a rounded, truncated square pyramid, as best seen in FIG. 14B. The optic 1450 can define, for example, a uniform square region of light.

The foregoing optics have been illustrated and described in terms of two-dimensional cross-sections. It should be apparent to those skilled in the art that these cross-sections can be extended, e.g., rotationally, in space to create a three-dimensional optic. Typically, such an extension takes the form of a rotationally symmetric three-dimensional extension about the optical axis (A), e.g., to create a circular device. However, the teachings herein can be applied to non-symmetric revolutions as well, e.g., in the case of a oval, parabola, and so on. In addition, the optics described herein can be linearly extended, for example in order to create a rectangular optic.

Any of the optics described above, and the light-shaping panel generally, can be made of polymethyl methacrylate (PMMA), glass, polycarbonate, cyclic olefin copolymer and cyclic olefin polymer, or any other suitable material. In one embodiment, the optics can be made of the same material as the remainder of the light-shaping panel. In another embodiment, the optics can be made of a different material than the light-shaping panel. By way of example, an optic can be formed by injection molding, by mechanically cutting a reflector or lens from a block of source material and/or polishing it, by forming a sheet of metal over a spinning mandrel, by pressing a sheet of metal between tooling die representing the final surface geometry including any local facet detail, and so on. Reflective surfaces can be created by a vacuum metallization process which deposits a reflective metallic (e.g., aluminum) coating, by using highly reflective metal substrates via spinning or forming processes. Faceting on reflective surfaces can be created by injection molding, by mechanically cutting a reflector or lens from a block of source material and/or polishing it, by pressing a sheet of metal between tooling die representing the final surface geometry including any local facet detail, and so on.

While the invention has been described with reference to the preferred embodiments, it will be understood by those skilled in the art that various obvious changes may be made, and equivalents substituted for elements thereof, without departing from the spirit of the present invention. Therefore, it is intended that the invention not be limited to the particular embodiments disclosed herein, but that the invention includes all embodiments falling within the scope of the appended claims.

What is claimed is:

1. An optical system, comprising:
   a substrate for supporting a plurality of light sources,
   a light-shaping panel comprising a plurality of lenses, each lens being optically coupled to one of said light sources, and
   a sealing membrane disposed between said substrate and said light-shaping panel and having a first surface and a second opposed surface separated from the first surface by a thickness of the membrane, each of said first and second surface having an adhesive distinct from said sealing membrane disposed on at least a portion thereof such that said sealing membrane and said adhesive cooperatively provide a seal against at least water between the substrate and the light-shaping panel,
   wherein said sealing membrane comprises a plurality of preformed openings aligned with said light sources and said lenses, such that at least a portion of light emitted by each light source that is optically coupled to one of said lenses passes through one of said openings to reach said lens, and
   wherein each of said plurality of openings of the sealing membrane substantially encircles one of said light sources so as to form an individual seal between the substrate and the light shaping panel around each of the light sources.

2. The optical system of claim 1, wherein said light-shaping panel comprises a distal surface facing an external environment and an opposed proximal surface facing the substrate, and said adhesive that is in contact with the light-shaping panel is configured to be in contact with at least about 70% of the proximal surface of said light-shaping panel, exclusive of portions of said proximal surface representing recesses for accommodating said plurality of light sources.

3. The optical system of claim 2, wherein said adhesive that is in contact with the light-shaping panel is configured to be in contact with at least about 80% of the proximal surface of said light-shaping panel, exclusive of the portions of said proximal surface representing recesses for accommodating said light sources.

4. The optical system of claim 2, wherein said adhesive that is in contact with the light-shaping panel is configured to be in contact with at least about 90% of the proximal surface of said light-shaping panel, exclusive of the portions of said proximal surface representing recesses for accommodating said light sources.

5. The optical system of claim 2, wherein said adhesive that is in contact with the light-shaping panel is configured to be in contact with substantially the entire proximal surface of said light-shaping panel, exclusive of the portions of said proximal surface representing recesses for accommodating said light sources.

6. The optical system of claim 1, wherein said lenses are configured to re-direct the received light such that the lenses collectively provide a substantially rectangular output light distribution.

7. The optical system of claim 1, wherein said sealing membrane comprises foam.

8. The optical system of claim 7, wherein said foam comprises a closed-cell foam.

9. The optical system of claim 8, wherein said closed-cell foam comprises acrylic.

10. The optical system of claim 1, wherein said light-shaping panel has a nominal surface area greater than about 4 square inches.

11. The optical system of claim 10, wherein the aspect ratio of the light-shaping panel is about 1.

12. The optical system of claim 10, wherein the nominal surface area is greater than about 9 square inches.

13. The optical system of claim 10, wherein the nominal surface area is greater than about 16 square inches.

14. The optical system of claim 1, wherein the light sources extend from the substrate into the openings.

15. The optical system of claim 1, wherein the plurality of lenses are configured to redirect light from the plurality of light sources into a Type VS (square) streetlight pattern.

16. The optical system of claim 1, wherein the sealing membrane is configured to meet the IP66 or greater standard.

17. The optical system of claim 1, wherein at least one of said lenses comprises:

an input surface configured to receive light from one of said light sources, an output surface, and at least one reflective surface configured to direct light from said input surface to said output surface by total internal reflection.

18. An optical system, comprising:

a substrate for supporting a plurality of light sources, a light-shaping panel comprising a plurality of optics, each optic being optically coupled to one of said light sources, and a sealing membrane disposed between said substrate and said light-shaping panel and having a first surface and a second opposed surface separated from the first surface by a thickness of the membrane, each of said first and second surface having an adhesive distinct from said sealing membrane disposed on at least a portion thereof so as to provide a seal between the substrate and the light-shaping panel, wherein the first surface has a first adhesive and the second surface has a second adhesive different from the first adhesive.

* * * * *